United States Patent [19]
Mayr

[11] Patent Number: 6,164,884
[45] Date of Patent: Dec. 26, 2000

[54] ANCHOR WITH SPREADING ELEMENTS

[76] Inventor: Alfred Friedrich Mayr, Schiesstand 3, A-6401 Inzing Oesterreich, Austria

[21] Appl. No.: 09/375,966

[22] Filed: Aug. 17, 1999

[51] Int. Cl.⁷ .............................. F16B 13/04; F16B 13/06
[52] U.S. Cl. .................................. 411/36; 411/32; 411/59; 411/60.2
[58] Field of Search .................. 411/32, 33, 34, 411/36, 37, 38, 59, 57.1, 60.2

[56] References Cited

U.S. PATENT DOCUMENTS

| | | | |
|---|---|---|---|
| 3,735,665 | 5/1973 | Mortensen | 411/36 |
| 5,205,688 | 4/1993 | Sundstrom | 411/38 |
| 5,312,215 | 5/1994 | Anquetin | 411/59 X |

FOREIGN PATENT DOCUMENTS

| | | | |
|---|---|---|---|
| 1525127 | 4/1968 | France | 411/36 |

*Primary Examiner*—Neill Wilson
*Attorney, Agent, or Firm*—Herbert L. Lerner; Laurence A. Greenberg; Werner H. Stemer

[57] ABSTRACT

The novel anchor has a neck portion formed with an opening for inserting a screw into the anchor, a head portion formed with an annular, circumferentially closed collar, and spreading elements connecting the neck portion with the head portion. Radially extending longitudinal webs connect the spreading element with the collar and they space the collar from the spreading elements.

10 Claims, 4 Drawing Sheets

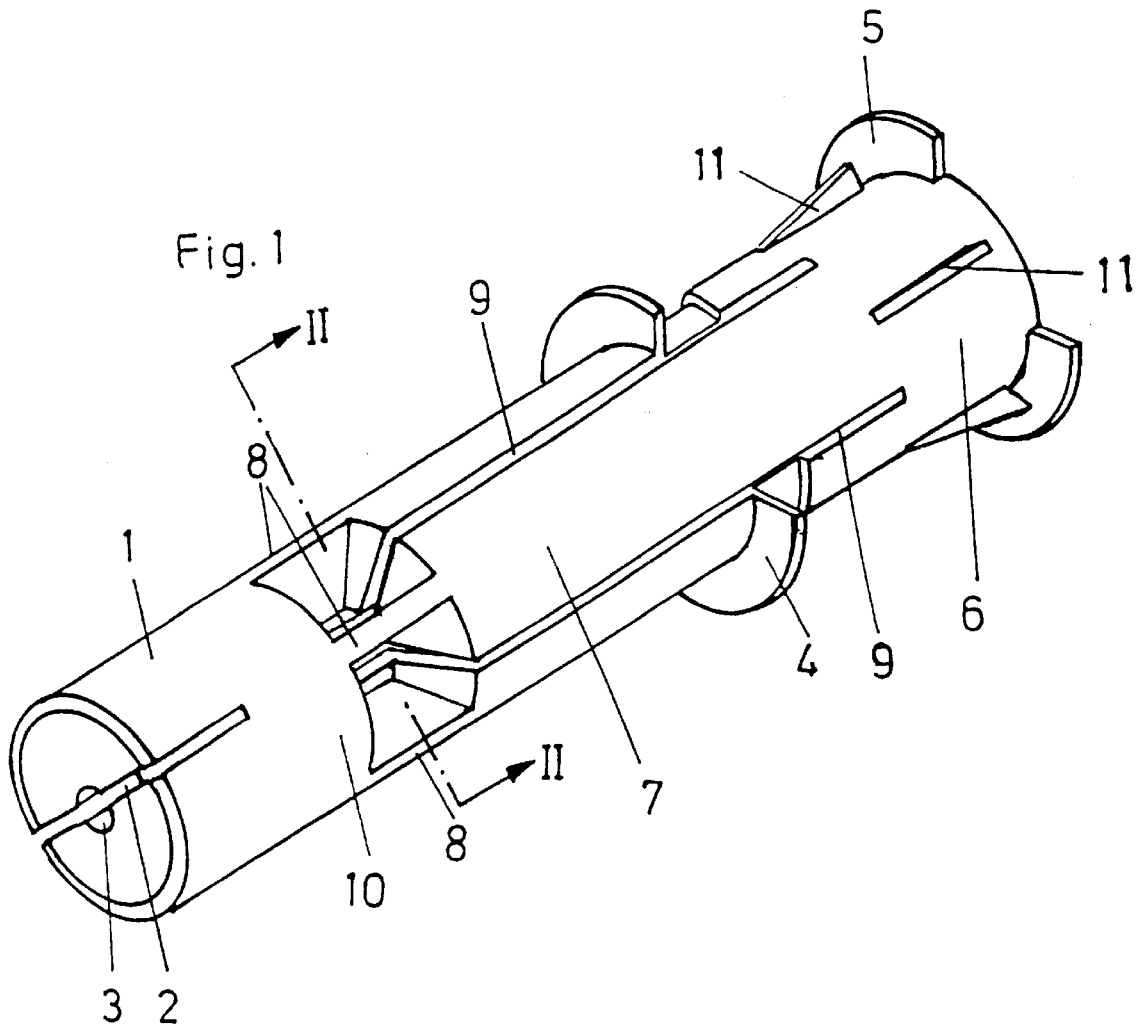

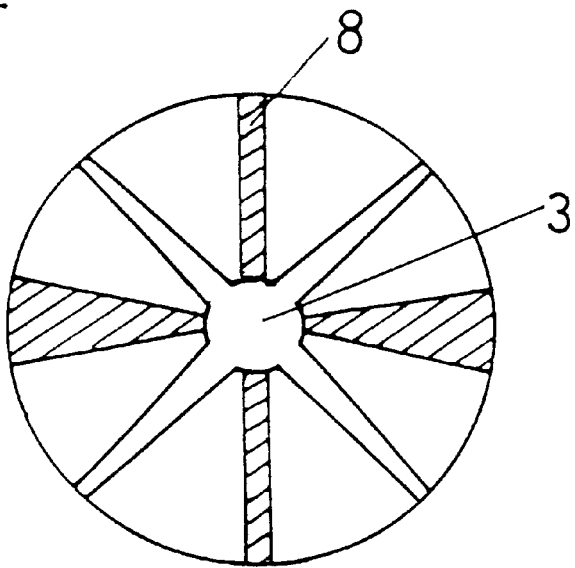
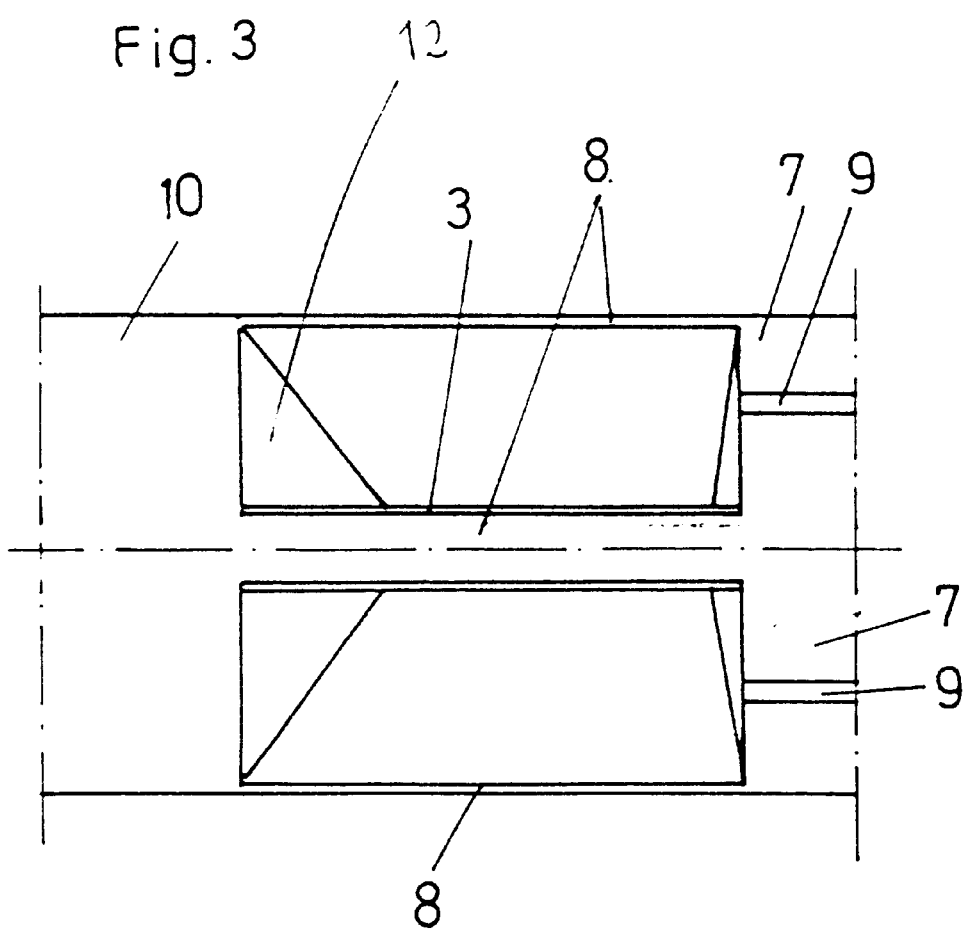

ANCHOR WITH SPREADING ELEMENTS

BACKGROUND OF THE INVENTION

Field of the Invention

The invention lies in the mechanical arts. More specifically, the invention pertains to an anchor, preferably a plastic spreading anchor, for fixing a screw in a bore hole, such as a drill hole or a throughhole. The anchor is formed with several longitudinal spreading elements between a neck portion and a head portion, which is provided with an annular collar. The screw is insertible through the neck portion.

In such prior art anchors a guide hole extends through the center of the head for the purpose of providing a self-tapping guide, i.e., into which the screw cuts its own thread. With increasing rotation of the screw, the head is pulled in a direction towards the wall surface in which the bore hole is formed. Due to the approach between the head and the neck portion, the spreading elements are expanded, until they come to lie against the wall of the bore hole and thereby engage in a form-locking and/or force-locking connection.

In solid building materials, such as hard concrete or natural rock, this leads to only a slight rotation of the head and/or to a twisting of the spreading elements. In softer materials on the other hand, the rearwardly moving head rotates relative to the rotationally stationary neck portion and thus twists the spreading elements.

SUMMARY OF THE INVENTION

It is accordingly an object of the invention to provide a plastic anchor, which overcomes the above-mentioned disadvantages of the heretofore-known devices and methods of this general type and which is maximized in terms of the spreading and twisting effects.

With the foregoing and other objects in view there is provided, in accordance with the invention, an anchor, comprising:

- a neck portion formed with an opening for inserting a screw into the anchor;
- a plurality of spreading elements connected to the neck portion;
- a head portion formed with an annular, circumferentially closed collar; and
- a plurality of radially extending longitudinal webs each connecting a respective spreading element with the collar and spacing the collar from the spreading elements.

The above objects are satisfied in that each spreading element is connected with the head-side collar via at least one web which extends from the interior of the anchor outwardly.

The effect of the inventive feature is that, when the screw is turned in, the webs first twist and the desired spiraling of the spreading elements occurs only subsequently.

These processes occur particularly controlled during the use of the anchor if the end of the anchor is provided with a conventional transverse slit. The end of the anchor spreads in that case when the screw protrudes to a sufficient extent from the end of the anchor. The anchor head is thereby fixed in its position and it forms a plug together with the rifled webs, which plug supports the effect of the expanded spreading elements.

In accordance with an added feature of the invention, a width of the Longitudinal webs is at most one third of a width of the spreading elements.

In accordance with an additional feature of the invention, the head portion is formed with a slit distally from the neck portion and extending in an axial direction in the head portion, and the head portion is a cylindrical body formed with a slightly conical end.

In accordance with another feature of the invention, an axial height of the collar not cut by the slit corresponds substantially to three turns of a screw to be inserted into the anchor through the insertion opening.

In accordance with a further feature of the invention, the collar has a cone thereon towards the neck portion. In a preferred embodiment, the cone rises at an angle of substantially 35° from its base surface.

The embodiment with the neck-side cone has proved particularly advantageous. This, first of all, has the effect that the webs, after twisting, are pushed outwardly by the cone against the bore hole and thereby provide for an additional spreading effect. The cone with the webs projecting therefrom is furthermore pulled between the screw and the spreading elements and acts as a wedge which pushes the ends of the spreading elements.

In accordance with again an added feature of the invention, the spreading elements have radially projecting flanges formed thereon in vicinity of the neck portion.

In accordance with again another feature of the invention, the spreading elements have an outer surface formed with slight structuring and not with conventional deep teeth and grooves.

In accordance with a concomitant feature of the invention, a plurality of radially projecting flanges are formed on the neck portion for limiting an insertion depth of the anchor into a bore hole, and, on insertion of the anchor into the bore hole and through-mounting, for folding over and preventing a rotation of the anchor in the bore hole.

Surprisingly, it turned out that the effect of the twisted/rifled spreading elements increases if they are not provided, as is conventional, with teeth distributed about their longitudinal extent. Profiling at the exterior of the anchor in the region of the spreading elements is thus only useful for increasing a frictional hold. The total surface lying against the wall of the bore hole, however, should not be reduced in the interest of the desired form lock.

Other features which are considered as characteristic for the invention are set forth in the appended claims.

Although the invention is illustrated and described herein as embodied in a plastic anchor, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWING

FIG. 1 is a perspective view of an exemplary embodiment;

FIG. 2 is a section taken along the line II—II in FIG. 1; and

FIG. 3 is a side view of the anchor in the region around the line II—II of FIG. 1;

DESCRIPTION OF THE PREFERRED EMBODIMENTS

Figure 4:
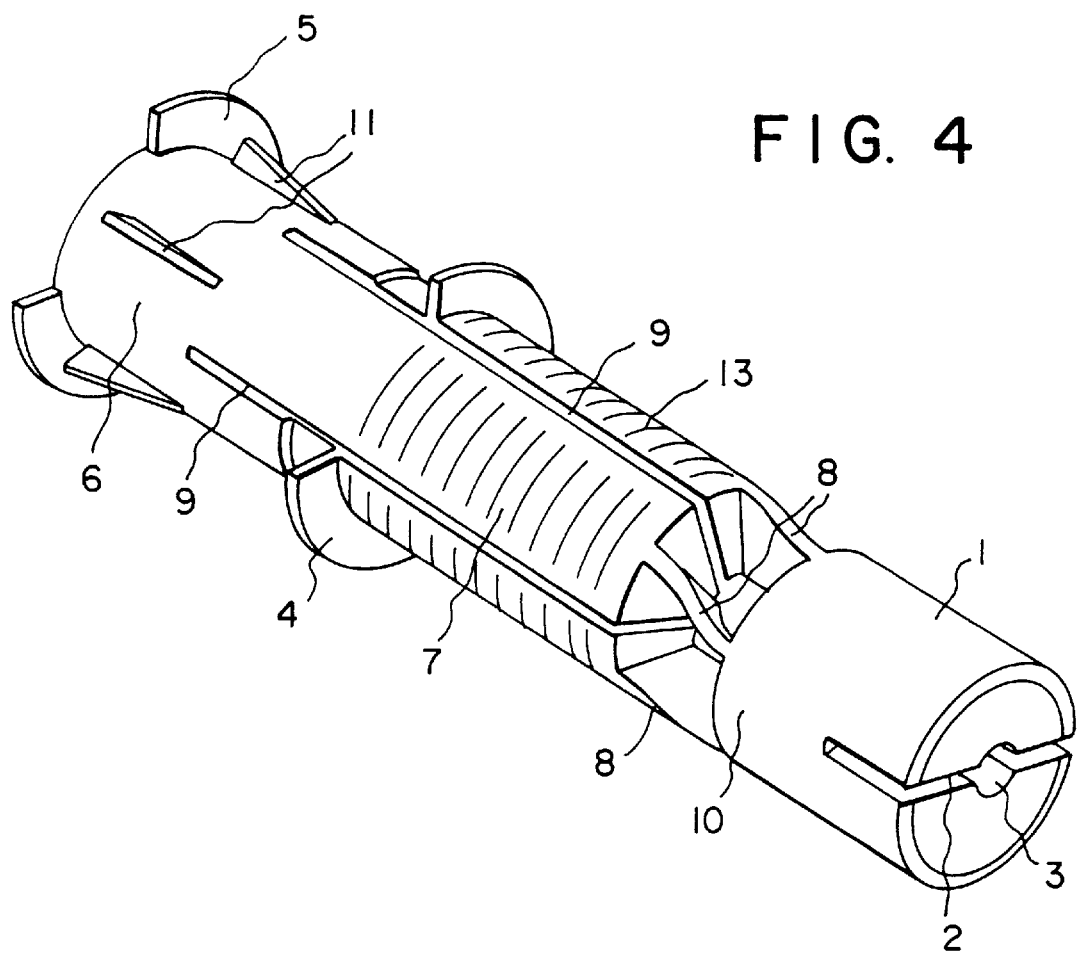
FIG. 4 is a perspective view of the anchor in a first twisting stage—with the webs twisted.

Referring now to the figures of the drawing in detail and first, particularly, to FIG. 1 thereof, there is seen an anchor which can be molded of plastic in a single mold processing step. For example, the anchor is injection molded. The anchor comprises a circumferentially closed neck portion 6, which is provided with flanges 5 for the purpose of limiting an insertion depth of the anchor into a bore hole or drill hole. The neck portion 6 is followed by spreading elements 7 or spreading webs, which are separated by slits 9. The spreading elements 7 are connected with a head 1 of the anchor via radially extending webs 8.

A central bore 3 of the anchor extends to the tip of the head 1 and the tip is formed with a transverse slit 2. The slit 2 ends at a given axial distance from the webs 8, so that a circumferentially closed collar 10 remains between the slit 2 and the webs 8. In the present exemplary embodiment there are also provided flanges 4 at the beginning region of the spreading elements 7, instead of the conventional tongues. The flanges 4 prevent a twisting of the insertion end of the spreading elements 7.

Figure 5:
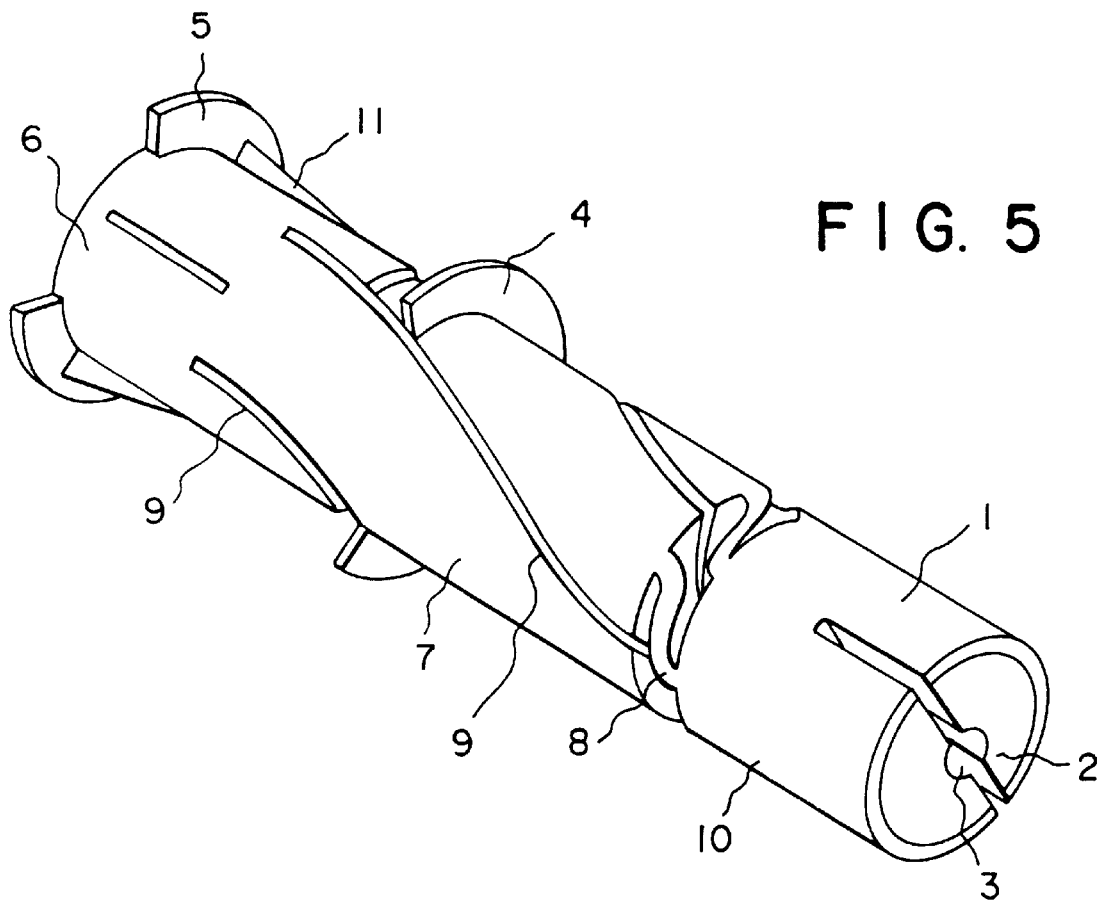
FIG. 5 is a similar view of a second twisting stage with the webs fully twisted and the spreading elements starting to twist as well.

Such twisting would result in particular in soft material if the head 1 were not only pulled towards the neck portion 6 by a screw but simultanteously twisted. If, however, the insertion-side ends of the spreading elements 7 are retained, hen the webs 8 are first twisted (FIG. 4) and as soon as the intermediate space between the collar 10 and the spreading elements 7 is closed by the obliquely turned webs 8, the spreading elements 7 are twisted similarly to rifling (see FIG. 5). This is particularly effective when the surface of the spreading elements 7 has only small relief inequalities, i.e. raised and indented structures 13 as shown in FIG. 4.

It is optionally also possible for the flanges 5 to be pressed into the bore hole at the neck-side end, so that they aid in fixing the neck portion of the screw together with the wedges 11.

The slit 2 at the end of the anchor head 1 is provided for the purpose to retain the head 1, when the screw has reached at a predetermined screw-in position, such that the described expansion and pulling process is terminated and the head 1 itself forms a stationary plug.

The length of the head must be large enough so that a sufficiently long collar 10 remains adjacent the slit 2 from which the screw does not tear out. A height defined by three screw rotations has proved sufficient, i.e., a height difference of three thread ridges measured axially along the screw.

Referring now to FIG. 3, a cone 12 at the neck-end side of the collar 10 forms the base of the webs 8. This has the effect that the twisted webs 8 are pressed against the bore hole wall. Furthermore, the cone 12 together with the webs 8 act as a wedge which pushes the ends of the spreading elements 7 apart.

The most conspicuous feature of the above-described anchor is surely the configuration of the anchor head, which improves the anchoring of the anchor in a threefold manner: First, due to the separation of the head from the spreading elements 7, the latter are not spiral twisted to the same extent as in the prior art. The webs which serve the separation, in cooperation with the carrying cone, not only lead to an increased spreading effect of the spreading elements, but also lead to an improved connection with the bore hole wall. Second, the processes effected by the insertion and screwing-in of the screw are topped off in a controlled manner by the slit formed at the end of the anchor head, which causes the anchor head to spread and to become a plug fixed in the desired position. Third, the construction of the spreading elements, which are not provided with the conventional form-lock teeth, assures the proper sequence of the above-described spreading processes inside the bore hole.

I claim:

1. An anchor, comprising:
   a neck portion formed with an opening for inserting a screw into the anchor;
   a plurality of spreading elements connected to said neck portion;
   a head portion formed with an annular, circumferentially closed collar; and
   a plurality of radially extending longitudinal webs each connecting a respective said spreading element with said collar and spacing said collar from said spreading elements.

2. The anchor according to claim 1, wherein a width of said longitudinal webs is at most on e third of a width of said spreading elements.

3. The anchor according to claim 1, wherein said head portion is formed with a slit distally from said neck portion and extending in an axial direction in said head portion.

4. The anchor according to claim 1, wherein said head portion is a cylindrical body formed with a slightly conical end.

5. The anchor according to claim 3, wherein an axial height of said collar not cut by said slit corresponds substantially to three turns of a screw to be inserted into the anchor through said insertion opening.

6. The anchor according to claim 1, wherein said collar has a cone thereon towards said neck portion.

7. The anchor according to claim 1, wherein said cone rises at an angle of substantially 35° from a base surface thereof.

8. The anchor according to claim 1, wherein said spreading elements have radially projecting flanges formed thereon in vicinity of said neck portion.

9. The anchor according to claim 1, wherein said spreading elements have an outer surface formed with slight structuring and not with conventional deep teeth and grooves.

10. The anchor according to claim 1, which comprises a plurality of radially projecting flanges formed on said neck portion for limiting an insertion depth of the anchor into a bore hole, and, on insertion of the anchor into the bore hole and through-mounting, for folding over and preventing a rotation of the anchor in the bore hole.

* * * * *